G. MORGAN & J. R. FOSTER.
Machines for Making Wooden Pins.
No. 149,326. Patented April 7, 1874.
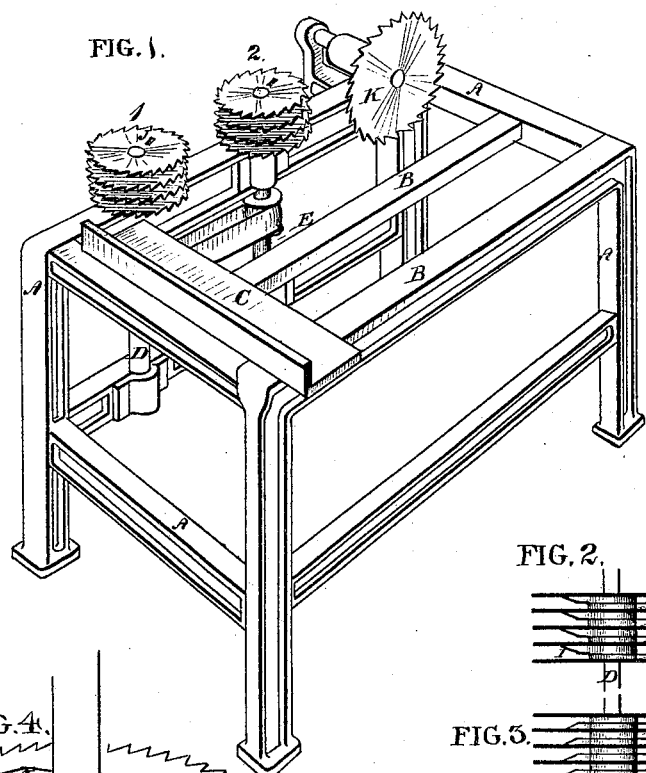
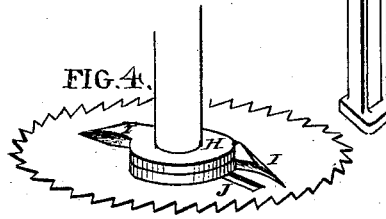
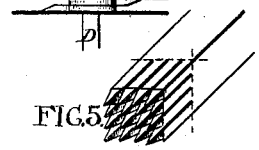
WITNESSES
INVENTORS.

UNITED STATES PATENT OFFICE.

GERRY MORGAN AND JACOB R. FOSTER, OF ANDOVER, NEW HAMPSHIRE; SAID FOSTER ASSIGNOR TO SAID MORGAN.

IMPROVEMENT IN MACHINES FOR MAKING WOODEN PINS.

Specification forming part of Letters Patent No. 149,326, dated April 7, 1874; application filed February 18, 1874.

*To all whom it may concern:*

Be it known that we, GERRY MORGAN and JACOB R. FOSTER, both of Andover, in the county of Merrimack and State of New Hampshire, have invented a new and Improved Machine for Making Pins, of which the following is a specification:

Our invention relates to the manufacture of spiles, pegs, or pins, used for plugging worm-holes in ships' hulls, and employed for other purposes, and consists in a novel construction, combination, and arrangement of parts in a machine that have for their object an efficient machine, capable of making spiles or pins with great rapidity and perfection.

Figure 1 is a perspective view of our improved machine. Fig. 2 is a vertical elevation of the saws and cutters used in the machine. Fig. 3 is a similar view to Fig. 2, turned half around. Fig. 4 is a perspective view of the cutters combined with the saw. Fig. 5 is a perspective view of the pegs in the last stage of their manufacture, preparatory to being sawed off; and Fig. 6 represents the peg in a finished state.

A represents a frame built after the ordinary fashion of wood-working machines, upon the upper part of which are tracks B B to receive a reciprocating carriage, C, while other parts of the frame support the saw-mandrels D E, and mechanism for driving the same. The gangs of saws and cutters, for slitting and pointing the spiles, are shown at 1 2. These saws are separated and adjusted by collars H, which carry the knives I; the thickness of these collars being dependent on the distance apart it is desired to have the saws for the size of the peg to be cut, and there may be any desired number of saws and cutters in a gang. The cutters are arranged in pairs, and are set opposite to each other on the saw-arbor, so as to give a free cut to the upper and under surface of the wedge part of the spile alternately, and to relieve the cutters from choking or clogging by reason of chips or shavings, and to prevent injury to the points of the spile. To further obviate this choking or injury to the spile, (one of our principal difficulties,) we perforate the saws, so as to form a chute for the chips and shaving to pass out unobstructed. This perforation or slot is plainly shown at J, Fig. 4. Directly in front of the gang of saws No. 1 is another set, No. 2, of similar construction and arrangement, for squaring and pointing the spiles, the operator having previously turned the stick around at right angles, so as to have the slits made by the saws of gang No. 1 in a vertical position. On passing the stick in this position to the saws of gang No. 2, a series of slits will be made at right angles to those made by gang No. 1, and the cutters, acting on the points of these spiles, will point them up. In front of gang No. 2 is a cutting-off saw K, to cut the spiles from the stick from which they are made, whence they pass into a hopper or trough and are carried away. It will be obvious that one gang of saws and cutters will make the spiles, and to do this it is only necessary to retract the carriage C, and stick from which the spiles are made, turn it at right angles, and again pass it through the saws and cutters, and thence to the cutting-off saw.

For rapidity of production the former way will be used, and where speed is not so much an object the latter plan may be adopted. In the first passage of the stick from which the spiles are made between the saws and cutters the wood will be slitted the proper size of the spile, and have cuneiform ends; the second set of saws and cutters will square and point them, the position of the stick being changed before passing to gang No. 2, or reiteration by gang No. 1.

We are aware that saws and cutters have been combined in the manipulation of wood, and we disclaim such a combination *per se.*

We claim as our invention—

1. The combination, with a supporting-frame, A, and reciprocating carriage C, of the series of saws and wedge-cutters 1, and cut-off saw K, constructed, arranged, and operating as described and set forth.

2. The combination, with the first series of saws and cutters 1, operated as described, of the second series of saws and cutters 2, whereby any return movement of the carriage for the second cut is obviated, as described and set forth.

GERRY MORGAN.
JACOB R. FOSTER.

Witnesses:
HENRY M. THOMPSON,
ELIAS H. WOODBURY.